Feb. 13, 1951

N. E. GADDINI 2,541,814

ICE CREAM FREEZER

Filed Nov. 15, 1948

INVENTOR
N. E. Gaddini

BY

ATTORNEYS

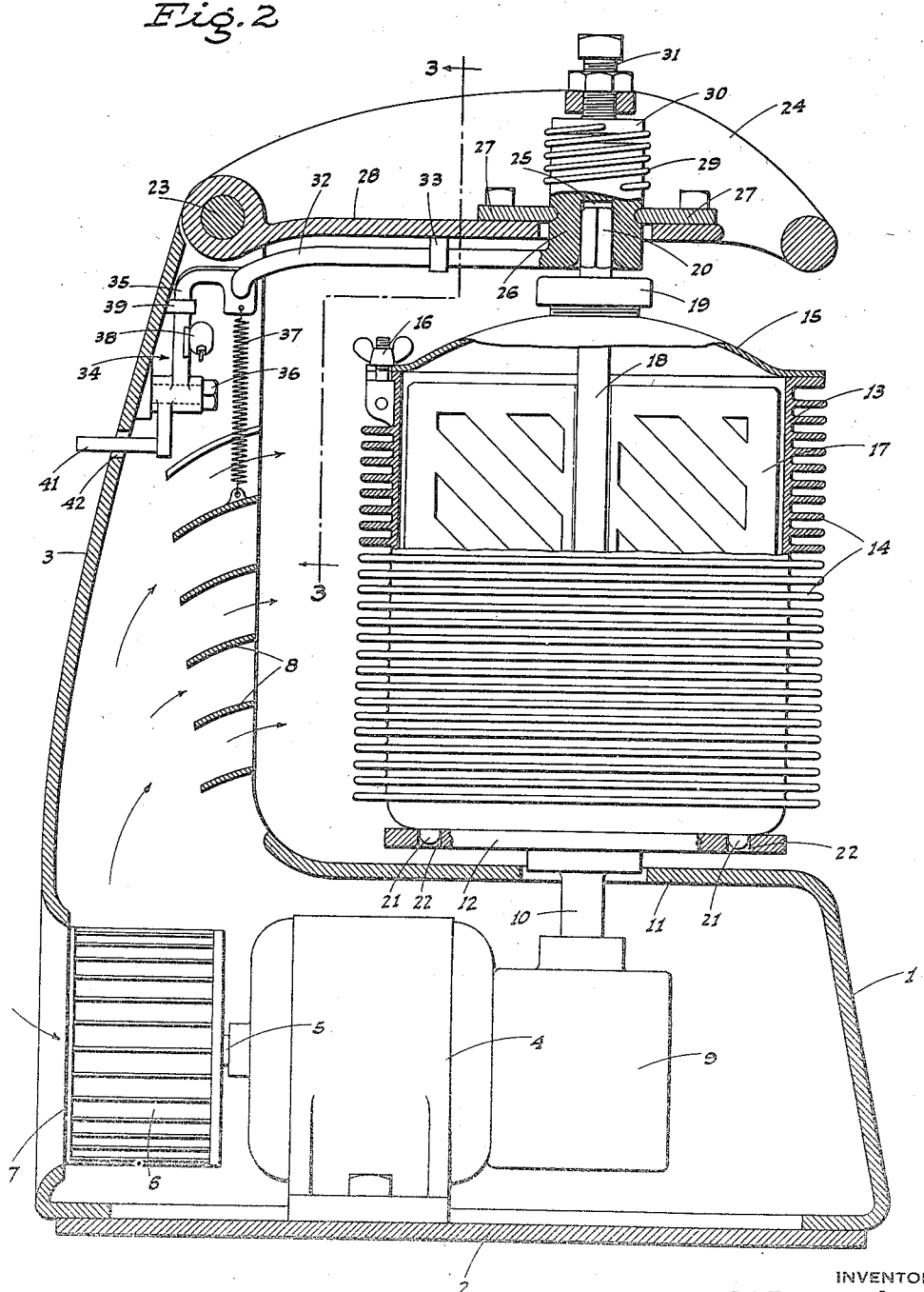

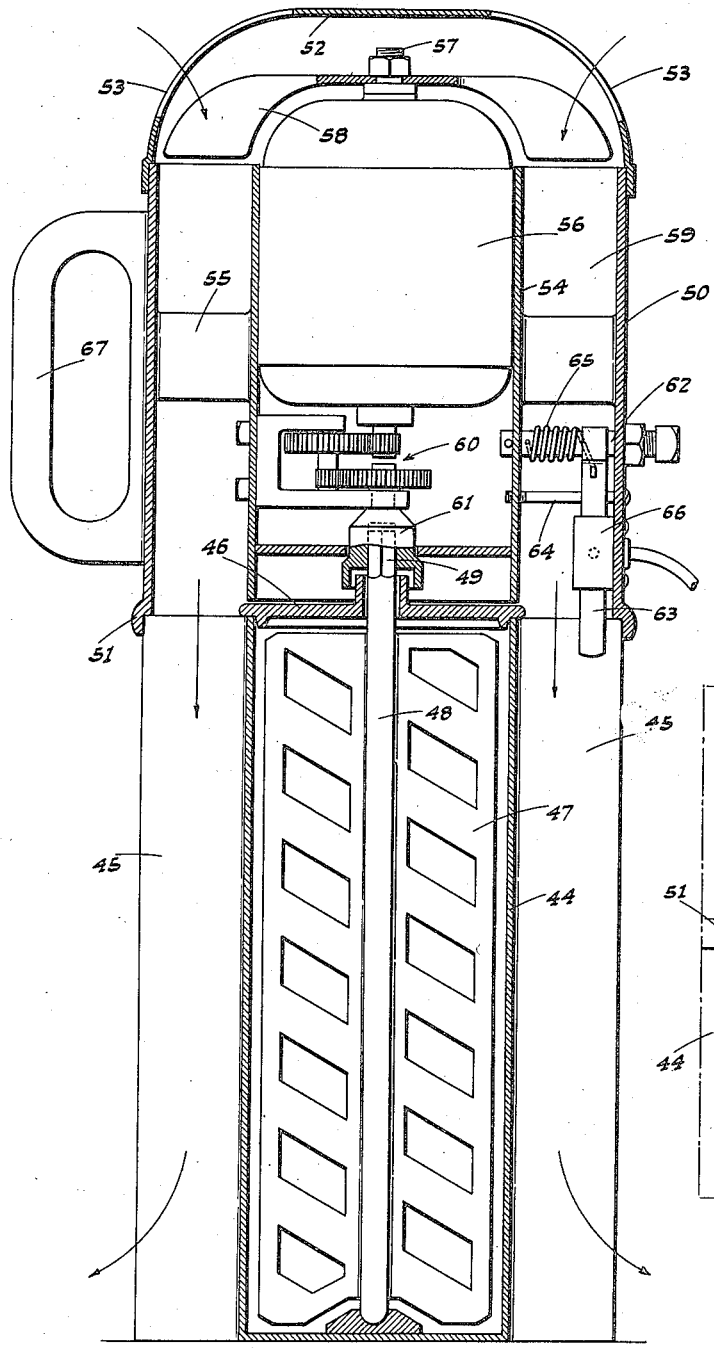
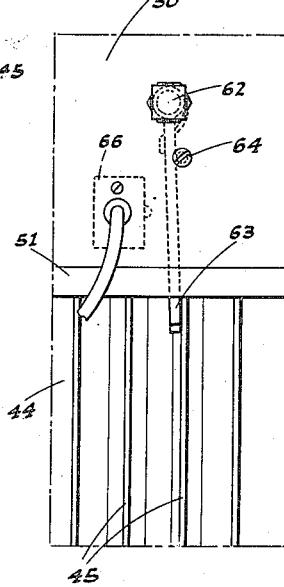
Fig. 4
Fig. 5
INVENTOR
N. E. Gaddini
ATTORNEYS

Patented Feb. 13, 1951

2,541,814

UNITED STATES PATENT OFFICE 2,541,814

ICE-CREAM FREEZER

Norman E. Gaddini, Winters, Calif.

Application November 15, 1948, Serial No. 60,146

18 Claims. (Cl. 62—114)

The present invention relates to, and it is an object to provide, a novel method and device for rapidly freezing ice cream, sherbets, and similar frozen mixtures which require continuous agitation by a dasher to yield a smooth product.

Another object of the invention is to provide a power driven, ice cream freezer which accomplishes the freezing of the mix by the novel use of the frigid air in a commercial frozen locker room, or in a home-type freezing locker, in which the device is disposed for operation; the frigid air being blower fed over a finned pail in which the mix is contained, and said pail and a dasher therein being relatively rotated during said operation.

A further object of the invention is to provide an ice cream freezer, as above, which thus eliminates the need of commercial refrigeration brines, or home-made salt and ice mixtures, as the freezing medium.

An additional object of the invention is to provide a power driven ice cream freezer which includes automatic shut-off mechanism which functions when the ice cream mix freezes to a certain thick or heavy consistency; such mechanism being responsive to predetermined relative resistance, between the pail and dasher, imposed by said frozen mix.

It is also an object of the invention to produce a power driven ice cream freezer which is of simple design, capable of manufacture economically; the device being readily portable, and constructed so as to require a minimum of servicing or repair.

A further object of the invention is to provide a practical and convenient ice cream freezer, and one which will be exceedingly effective for the purpose of which it is designed.

These objects are accomplished by means of such structure and relative arrangement of parts as will fully appear by a perusal of the following specification and claims.

In the drawings:

Fig. 2 is an enlarged sectional elevation of the ice cream freezer.

Fig. 4 is a sectional elevation of a modified type of the ice cream freezer.

Fig. 5 is a fragmentary elevation, on reduced scale, of one side of the ice cream freezer shown in Fig. 4.

Figure 1:
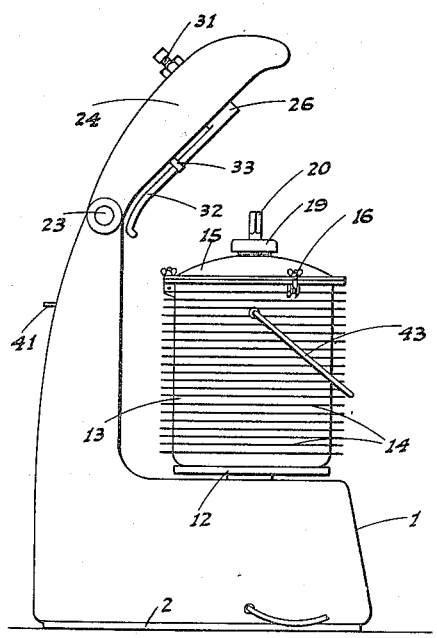
Fig. 1 is a side elevation of the ice cream freezer with the hinged top arm in its raised position.
Figure 3:
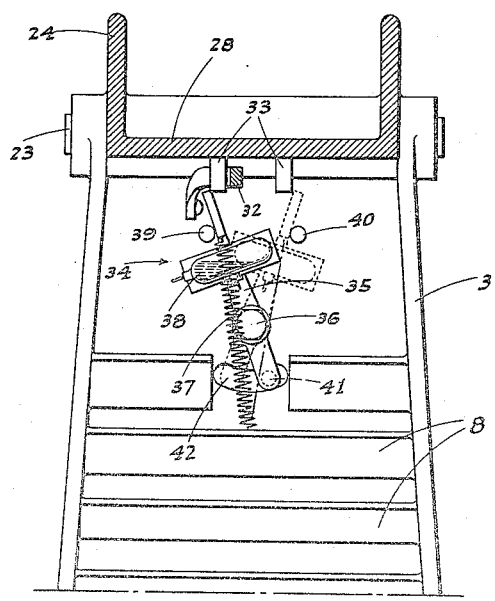
Fig. 3 is a cross section on line 3—3 of Fig. 2.

Referring now more particularly to the characters of reference on the drawings, and particularly at present to Figs. 1–3, the ice cream freezer comprises a hollow upstanding base housing 1, which includes a bottom 2; there being an upstanding post 3 at the rear of the base housing 1.

The post 3 is channel-like and opens forwardly for the purpose hereinafter described, and at its lower end said channel-like post 3 is in communication with the base housing 1.

An electric motor 4 is mounted in the base housing 1 intermediate its ends; such motor having a rearwardly projecting shaft 5 fitted with a squirrel cage blower 6 which cooperates with an air entry port 7 in the back of the base housing.

Upon actuation of the motor 4 the blower 6 functions to draw air through the port 7 and to feed said air as a continuous stream upwardly in the channel-like post 3; there being a plurality of vertically spaced deflectors 8 in said post operative to divert the air flow from its upward direction of travel from the blower 6, to a plurality of forward paths in planes above the base housing 1. The path of air flow is indicated by arrows in Fig. 2.

At its forward end the motor 4 is fitted with, and drives, a reduction gear box 9 having a vertical output shaft extending upwardly therefrom through the top 11 of the base housing 1, and above such top 11 the shaft 10 is fitted with a turntable 12.

The numeral 13 indicates an upstanding cylindrical pail formed, exteriorly from top to bottom, with a multiplicity of circumferential fins 13 disposed in vertically spaced relation.

The top of the pail 13 is adapted to be closed by a lid 15 removably held in place by a plurality of circumferentially spaced wing nut units 16.

A dasher 17 is disposed in the pail 13 and is carried by a central upstanding dasher post 18 which projects through a packing gland 19 centrally on the lid 15. Above the packing gland 19, the dasher post 18 is formed with a square upper end portion 20.

The dasher 17 runs, at its outer vertical edges, in relatively close relation to the sides of the pail 13; and said dasher is slotted in a manner, as shown, to tend to work the mix in the pail inwardly from its sides.

When the device is in use the pail 13 is seated on the turntable 12, and downwardly projecting detents 21 on the bottom of the pail are received in matching sockets 22 in the turntable 12. This arrangement not only centers the pail 13 on the turntable 12, but assures of positive rotation of the pail.

At its upper end the post 3 is connected by a transverse pivot 23 to the rear end of a hinged top arm 24 adapted to swing between a raised, forwardly and upwardly inclined position, as in Fig. 1, and a lowered, forwardly projecting horizontal position, as in Fig. 2.

When the top arm 24 is in its lowered position, the upwardly projecting square, upper end portion 20 of the dasher post 18 engages in matching relation in a non-circular socket 25 formed in downwardly opening relation in a rotatably mounted head 26. The rotatably mounted head 26 is normally yieldably held against rotation by a helical torsion spring 29 which is affixed, at one end, to, and extends axially above, said head 26. At its upper end the helical torsion spring 29 connects to an adjustable but normally stationary head 30 carried by a nut locked bolt 31.

With the above arrangement the head 26 normally holds the dasher 17 against rotation while the finned pail 13 is rotated thereabout by the motor driven turntable 12.

Below the bottom 28 of the top arm 24 the head 26 includes a radial, rearwardly extending switch finger 32 which is disposed for limited play between a pair of stops 33 which depend from said bottom 28; the helical torsion spring 29 normally acting to hold the switch control finger 32 against one of the stops 33, as in Fig. 3.

At its free end, which projects into the channel-like post 3, the switch control finger 32 is formed and disposed for actuating a snap action switch unit, indicated generally at 34, which switch unit controls operation of the motor 4. The snap action switch unit 34 is normally closed, as in full lines in Fig. 3, and includes an upstanding switch lever 35 pivoted, intermediate its ends, as at 36, to the post 3; there being a tension spring 37 connected in snap action relation to the switch lever 35. Said switch lever is fitted with a mercury switch 38, which switch is interposed in the circuit for motor 4 and is normally closed when the switch lever 35 is in its full line position of Fig. 3, wherein said lever then rests against a stop 39.

When the switch lever 35 is tripped from its normal position beyond dead-center to its other position, as in dotted lines in Fig. 3, the mercury switch 38 is open and the lever 35 rests against another stop 40.

At its lower end the switch lever 35 includes a horizontal, rearwardly projecting switch handle 41 which extends through a slot 42 in the back of the post 3 for manual actuation.

The above described ice cream freezer is used in the following manner:

The pail 13, which includes a bail 43 for convenience of handling, is filled with a quantity of ice cream mix and is disposed on the turntable 12 in proper position. Then the top arm 24 is lowered to its horizontal position to engage the square upper end portion 20 of dasher post 18 in socket 25 of the head 26.

The device is then placed in an enclosure having zero or below zero temperature air therein; such enclosure being a commercial freezing locker room, or a freezing locker of home type. With the device in such an enclosure the motor 4 is placed in operation by proper manipulation of the switch handle 41, which disposes the snap action switch unit 34 with the mercury switch 38 closed. This results in simultaneous drive of the squirrel cage blower 6 and rotation of the turntable 12 and supported finned pail 13. Consequently, as the finned pail rotates, a stream of frigid air is drawn into the device and fed upwardly in the channel-like post 3 by blower 6, and is thence diverted by deflectors 8 directly into engagement with and about the finned pail 13. This accomplishes a very effective and rapid heat exchange, causing freezing of the ice cream mix in the pail 13 much faster than otherwise possible.

With rotation of the finned pail 13 about the normally stationary dasher 17, the ice cream mix is thoroughly agitated, as is necessary to the production of smooth ice cream.

As the ice cream mix in the pail freezes to a predetermined consistency or thickness, there is a resultant relative resistance to rotation between the pail 13 and dasher 17, which urges said dasher 17 in a rotative direction against the torsion of the spring 29. As such relative resistance to rotation increases there is a gradual rotation of the head 26, swinging the switch control finger 13 between the stops 33, whereupon said finger 32 engages the lever 35 and actuates the snap action switch unit 34 to open position. This breaks the circuit for the motor 4, and the latter ceases to operate. In this manner there is an automatic shut off of the device when the ice cream mix in the pail 13 freezes to the desired thickness.

Thereafter the pail 13, and included dasher 17, may be removed from the remainder of the device for completion of freezing, and storage, of the ice cream.

Alternatively, as for home use, the pail 13 may remain on the turntable 12 for the remaining freezing period.

It is contemplated that for commercial installation one of the devices will have a multiplicity of the pails 13, with included dashers 17, so that production of ice cream may be carried out on a relatively continuous basis.

The described ice cream freezer not only functions rapidly and effectively, but produces a better ice cream than is accomplished by commercial refrigeration brines, or by home made salt and ice mixtures as the freezing medium.

The device is readily portable and handy to use; there being no mechanism requiring more than minimum servicing.

In Figs. 4 and 5 there is illustrated another embodiment of the invention, wherein the freezing of the mix is likewise accomplished by frigid air blower-fed over a finned pail, wherein there is relative rotation between the pail and an internal dasher. In this embodiment the structure is as follows:

The numeral 44 indicates a cylindrical upstanding pail formed, in integral relation thereabout, with a multiplicity of vertically extending, radiating fins 45; the pail with projecting fins forming its own support.

At the top the pail 44 is closed by a removable lid 46, and a dasher 47 is disposed in the pail, being supported for rotation by a dasher post 48. The upper end portion of the dasher post projects above the lid 46 and is there squared, as at 49.

An upstanding cylindrical housing 50 is downwardly outwardly flanged at its lower edge, as at 51, for engagement in locating relation on the upper end of the assembly of fins 45; the housing 50 thus being removably supported above the pail 44 in concentric relation thereto. The housing 50 includes a cap 52 formed with a circumferential row of slots 53.

In spaced relation below the cap 52, and within the housing 50, in concentric relation, there is mounted a vertical sleeve 54; such sleeve being supported from the housing 50 by a spider 55.

A vertical axis electric motor 56 is secured in the upper portion of the sleeve 54, and said motor includes an upstanding shaft 57 to which is secured a vertical axis blower or fan 58 formed so that upon rotation of said fan it sucks air through the slots 53 and discharges the air downwardly in the passage 59 which exists between said sleeve 54 and the housing 50. From the passage 59 the air flows downwardly alongside the pail 44 between the fins 45, as indicated by the arrows in Fig. 4.

At its lower end the motor 56 drives a reduction gear train 60 disposed in the sleeve 54, and in turn such gear train rotates a downwardly opening socket head 61 which receives the square upper end portion 49 of the dasher post 48 in matching relation.

The automatic shut-off mechanism in this embodiment comprises a normally fixed but rotatable adjustable shaft 62 extending between the housing 50 and sleeve 54 some distance above their lower ends. A depending switch control finger 63 is swingably mounted in connection with the shaft 62 and depends to a point between adjacent ones of the fins 45. The depending switch control finger 63 is normally maintained against a stop 64 by means of a helical torsion spring 65 connected between shaft 62 and said finger. A push button or micro switch 66 is mounted in the housing 50 adjacent the finger 63, and on the side opposite the stop 64; the switch 66 normally being spaced somewhat from such finger.

In use of the embodiment shown in Figs. 4 and 5, and as described above, the pail 44 first has a quantity of ice cream mix placed therein, and then the lid 46 is disposed in place. Thence the housing 50, with its included mechanism, is set on top of the pail and fin assembly, as shown, with the squared upper end portion 49 of the dasher post 48 disposed in the socket head 61.

A handle 67 on the housing 50 facilitates its manipulation.

With the device thus assembled, it is placed in an enclosure wherein the air is frigid, such as a commercial locker room or a home type freezer locker. With the device so disposed the electric motor 56 is placed in operation, which simultaneously drives the dasher 47, rotating it in the pail 44, and causing a flow of frigid air downwardly from the fan 58, through passage 59, and between the fins 45. With the frigid air thus flowing there is a rapid heat exchange from the pail 44, whereby freezing of the mix therein results in a relatively short time, in substantially the same way as described in connection with the embodiment of Figs. 1-3, inclusive.

When the mix freezes to a predetermined consistency or thickness, the resultant resistance to relative rotation between the dasher 47 and pail 44 causes the housing 50 to turn relatively on the finned pail. This results in the depending switch control finger 63, which is engaged by one of the fins 45, swinging toward, engaging, and opening the switch 66; the latter being normally closed and interposed in the circuit for the motor 56. In this manner there is an automatic stopping of the motor 56.

After the freezing operation, and to gain access into the pail 44, it is only necessary to remove the housing 50 by means of handle 67, whereupon access to lid 46 is obtained.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An ice cream freezer adapted to function in an enclosure wherein the air is frigid, comprising a pail for ice cream mix, a dasher in the pail, and power drive means operative to cause relative rotation between the pail and dasher, and to simultaneously blow a stream of said frigid air onto the pail.

2. An ice cream freezer adapted to function in an enclosure wherein the air is frigid, comprising a pail for ice cream mix, a dasher in the pail, and power drive means operative to cause relative rotation between the pail and dasher, and to simultaneously blow a stream of said frigid air onto the pail; the latter having a plurality of exterior fins in the path of said stream of frigid air.

3. An ice cream freezer, as in claim 2, in which said pail is upright and the fins horizontal in vertically spaced relation; the stream of air being directed generally horizontally onto the finned pail.

4. An ice cream freezer, as in claim 2, in which the pail is upright and the fins vertical in circumferentially spaced relation; the stream of air being directed generally vertically onto the finned pail.

5. An ice cream freezer adapted to function in an enclosure wherein the air is frigid, comprising a pail for ice cream mix, a dasher in the pail, power drive means arranged to cause relative rotation between the pail and dasher, and means operative to blow a stream of said frigid air onto the pail; said power drive means including a turntable on which the pail is disposed, and a holding device coupled to the dasher to normally prevent its rotation.

6. An ice cream freezer adapted to function in an enclosure wherein the air is frigid, comprising a pail for ice cream mix, a dasher in the pail, power drive means arranged to cause relative rotation between the pail and dasher, and means operative to blow a stream of said frigid air onto the pail; said power drive means including a turntable on which the pail is disposed, a holding device coupled to the dasher to normally prevent its rotation, said holding device being yieldable upon predetermined resistance to relative rotation between the pail and dasher resulting from freezing of ice cream mix in said pail to a certain thickness, and mechanism responsive to yielding of the holding device operative to shut off the drive means.

7. An ice cream freezer adapted to function in an enclosure wherein the air is frigid, comprising a pail for ice cream mix, a dasher in the pail, power drive means arranged to cause relative rotation between the pail and dasher, and means operative to blow a stream of said frigid air onto the pail; said power drive means rotating the pail about the dasher, a holding device coupled to the dasher to normally prevent its rotation, said holding device being yieldable upon predetermined resistance to relative rotation between the pail and dasher resulting from freezing of ice cream mix in said pail to a certain thickness, and mechanism responsive to yielding of the holding device operative to shut off the drive means.

8. An ice cream freezer adapted to function in an enclosure wherein the air is frigid, comprising a pail for ice cream mix, a dasher in the pail, power drive means arranged to cause relative rotation between the pail and dasher, and means to blow a stream of said frigid air onto the pail; said power drive means rotating the dasher in the pail, and mechanism response to predetermined resistance to relative rotation between the pail and dasher resulting from freezing of ice cream mix in said pail to a certain thickness, operative to shut off said power drive means.

9. An ice cream freezer adapted to function in an enclosure wherein the air is frigid, comprising a hollow base housing, a motor in the base housing having a shaft projecting upward therethrough, a turntable on the shaft above the base housing, an exteriorly finned pail removably disposed on the turntable for rotation therewith, a dasher in the pail including a dasher post projecting above said pail, a holding device cooperating with the projecting upper end portion of the dasher post to normally prevent its rotation, and means operative to blow a stream of said frigid air onto the pail.

10. An ice cream freezer adapted to function in an enclosure wherein the air is frigid, comprising a hollow base housing, a motor in the base housing having a shaft projecting upward therethrough, a turntable on the shaft above the base housing, an exteriorly finned pail removably disposed on the turntable for rotation therewith, a dasher in the pail including a dasher post projecting above said pail, a holding device cooperating with the projecting upper end portion of the dasher post to normally prevent its rotation, and means operative to blow a stream of said frigid air onto the pail; said last named means including an upstanding channel-shaped post on the base housing opening toward the pail, a blower driven by said motor operative to feed said stream upward in the post, and deflectors in the post positioned to deflect the stream of air onto the finned pail.

11. An ice cream freezer adapted to function in an enclosure wherein the air is frigid, comprising a base, a motor driven turntable above the base, a post upstanding from the base clear of the turntable, a hinged top arm on the post movable between a raised and a lowered position, an exteriorly finned pail removably disposed in the turntable for rotation therewith, a dasher in the pail including a dasher post projecting above said pail, and a holding device on the hinged top arm releasably engaging the projecting upper end of the dasher post when said arm is in lowered position whereby to normally prevent rotation of the dasher post and dasher; said holding device including a socketed, dasher post receiving head yieldable in a rotary direction upon predetermined resistance to relative rotation between the pail and dasher resulting from freezing of ice cream mix in said pail to a certain thickness, and mechanism responsive to said rotary yielding of the head to shut off said motor driven turntable.

12. An ice cream freezer, as in claim 11, including an electric motor driving the turntable, a normally closed switch for the motor, and a switch control finger radiating from said head and positioned to engage and open the switch upon predetermined rotation of the head.

13. An ice cream freezer adapted to function in an enclosure wherein the air is frigid, comprising a hollow base housing, an electric motor unit in the base housing, a turntable above the base housing driven by the motor unit, a finned pail removably disposed on the turntable for rotation therewith, a blower in the base housing driven by the motor unit, a post upstanding from the base housing clear of the pail, passage means in part in the post operative to deliver a stream of frigid air from the blower onto the finned pail, the pail including a dasher having an upwardly projecting dasher rod, a hinged top arm projecting from the post in overhanging relation to the pail, and a holding device on the top arm releasably engaging the adjacent projecting end of the dasher post to normally prevent its rotation.

14. An ice cream freezer adapted to function in an enclosure wherein the air is frigid, comprising a hollow base housing, an electric motor unit in the base housing, a turntable above the base housing driven by the motor unit, a finned pail removably disposed on the turntable for rotation therewith, a blower in the base housing driven by the motor unit, a post upstanding from the base housing clear of the pail, passage means in part in the post operative to deliver a stream of frigid air from the blower onto the finned pail, the pail including a dasher having an upwardly projecting dasher post, a hinged top arm projecting from the post in overhanging relation to the pail, and a holding device on the top arm releasably engaging the adjacent projecting end of the dasher post to normally prevent its rotation; said holding device including a socket head cooperating with said adjacent projecting end of the dasher post, said head being yieldable in a rotary direction upon predetermined resistance to relative rotation between the pail and dasher resulting from freezing of ice cream mix in said pail to a certain thickness, a radial finger on the head, and a normally closed motor control switch in the path of motion of said finger whereby upon yielding and rotation of the head in said direction, the finger engages and opens the switch.

15. An ice cream freezer adapted to function in an enclosure wherein the air is frigid, comprising a finned pail having a dasher therein including an upper projecting dasher post, and a combination dasher post drive and fan unit adapted to releasably seat on top of the finned pail in driving connection with the projecting dasher post, and operative to simultaneously direct a stream of frigid air onto the finned pail.

16. An ice cream freezer adapted to function in an enclosure wherein the air is frigid, comprising a finned pail having a dasher therein including an upper projecting dasher post, and a combination dasher post drive and fan unit adapted to releasably seat on top of the finned pail in driving connection with the projecting dasher post, and operative to simultaneously direct a stream of frigid air onto the finned pail; there being means responsive to predetermined resistance to relative rotation between the pail and dasher resulting from freezing of ice cream mix in said pail to a certain thickness operative to shut off said drive and fan unit.

17. An ice cream freezer adapted to function in an enclosure wherein the air is frigid, comprising a finned pail having a dasher therein including an upper projecting dasher post, an upstanding housing releasably seated on top of the finned pail, the fins of the pail being vertical, a motor unit in the housing, a socket head in the housing driven by the motor unit, the projecting dasher post releasably engaging in said socket head, and a motor unit driven fan in the housing operative to direct a stream of frigid air downwardly between said vertical fins.

18. An ice cream freezer adapted to function in an enclosure wherein the air is frigid, comprising a finned pail having a dasher therein including an upper projecting dasher post, an upstanding housing releasably seated on top of the finned pail, the fins of the pail being vertical, a motor unit in the housing, a socket head in the housing driven by the motor unit, the projecting dasher post releasably engaging in said socket head, and a motor unit driven fan in the housing operative to direct a stream of frigid air downwardly between said vertical fins; predetermined resistance to relative rotation between the pail and dasher resulting from freezing of ice cream mix in said pail to a certain thickness, causing the housing to rotate a part turn on the finned pail, a normally closed switch for the motor unit, and mechanism responsive to said part turn of the housing arranged to cause opening of said switch.

NORMAN E. GADDINI.

REFERENCES CITED

The following references are of record in the file of this patent:

UNITED STATES PATENTS

| Number | Name | Date |
|---|---|---|
| 1,956,322 | Grant | Apr. 24, 1934 |
| 1,978,176 | Stenstrup | Oct. 23, 1934 |
| 1,981,009 | Torson | Nov. 20, 1934 |
| 2,053,520 | Eisenmann | Sept. 8, 1936 |